(12) United States Patent
Lee et al.

(10) Patent No.: US 12,179,768 B2
(45) Date of Patent: Dec. 31, 2024

(54) ROAD SURFACE CONDITION ESTIMATION APPARATUS AND ROAD SURFACE CONDITION ESTIMATION METHOD USING THE SAME

(71) Applicant: HANKOOK TIRE & TECHNOLOGY CO., LTD, Seongnam-si (KR)

(72) Inventors: Ho Jong Lee, Daejeon (KR); Min Tae Kim, Daejeon (KR); Saied Taheri, Blacksburg, VA (US)

(73) Assignee: HANKOOK TIRE & TECHNOLOGY CO., LTD, Seongnam-si (KR)

( * ) Notice: Subject to any disclaimer, the term of this patent is extended or adjusted under 35 U.S.C. 154(b) by 915 days.

(21) Appl. No.: 17/038,507

(22) Filed: Sep. 30, 2020

(65) Prior Publication Data

US 2021/0101603 A1 Apr. 8, 2021

(30) Foreign Application Priority Data

Oct. 2, 2019 (KR) .................. 10-2019-0122275

(51) Int. Cl.
*B60W 40/06* (2012.01)
*B60W 30/02* (2012.01)
*B60W 40/10* (2012.01)
*B60W 50/14* (2020.01)
*G06N 20/00* (2019.01)

(52) U.S. Cl.
CPC .......... *B60W 40/06* (2013.01); *B60W 30/02* (2013.01); *B60W 40/10* (2013.01); *B60W 50/14* (2013.01);

(Continued)

(58) Field of Classification Search
CPC ...... B60W 40/06; B60W 30/02; B60W 40/10; B60W 50/14; B60W 2552/00;

(Continued)

(56) References Cited

U.S. PATENT DOCUMENTS 8,942,861 B2 * 1/2015 Wakao .................. B60W 40/06
701/1
8,983,749 B1 * 3/2015 Singh ...................... B60T 8/172
701/71

(Continued)

FOREIGN PATENT DOCUMENTS

CN 1608012 A 4/2005
CN 109641492 A 4/2019

(Continued)

*Primary Examiner* — Russell Frejd
*Assistant Examiner* — Sara J Lewandroski
(74) *Attorney, Agent, or Firm* — Bridgeway IP Law Group, PLLC; Jihun Kim

(57) ABSTRACT

A road surface condition estimation apparatus which accurately estimates a road surface condition even under changes of external environment such as weather, etc., and a road surface condition estimation method using the same is described. The road surface condition estimation apparatus includes: a sensor module which is mounted on a tire; a receiver module which receives sensing information measured by the sensor module; a processing module which extracts a parameter for estimating a road surface condition by analyzing the sensing information received by the receiver module; and an estimation module which estimates the road surface condition by using the parameter extracted by the processing module. The sensing information includes an acceleration of the tire.

13 Claims, 12 Drawing Sheets

(52) U.S. Cl.
CPC ....... *G06N 20/00* (2019.01); *B60W 2050/146* (2013.01); *B60W 2520/00* (2013.01); *B60W 2530/20* (2013.01); *B60W 2552/00* (2020.02)

(58) Field of Classification Search
CPC ....... B60W 2050/146; B60W 2520/00; B60W 2530/20; B60W 40/064; B60W 40/068; B60W 2270/70; B60W 2552/05; B60W 2552/35; B60W 2552/40; B60W 2240/00; B60W 2240/03; G06N 20/00
See application file for complete search history.

(56) References Cited

U.S. PATENT DOCUMENTS

| | | | |
|---|---|---|---|
| 9,170,102 B2 | 10/2015 | Hanatsuka et al. | |
| 11,549,809 B2 | 1/2023 | Sekizawa | |
| 2008/0015763 A1* | 1/2008 | Kitazaki | B60C 23/064 |
| | | | 73/146 |
| 2009/0116697 A1* | 5/2009 | Shalaby | G01N 21/55 |
| | | | 382/108 |
| 2013/0116972 A1* | 5/2013 | Hanatsuka | G01B 17/08 |
| | | | 702/167 |
| 2018/0222458 A1 | 8/2018 | Takatoshi et al. | |
| 2020/0284648 A1* | 9/2020 | Kanbayashi | B60K 35/22 |
| 2020/0372790 A1* | 11/2020 | Ahmed | G01C 21/04 |

FOREIGN PATENT DOCUMENTS

| | | | |
|---|---|---|---|
| JP | 2005249525 A | 9/2005 | |
| JP | 4439985 B2 | 3/2010 | |
| JP | 2011203017 A | 10/2011 | |
| JP | 2017081380 A | 5/2017 | |
| JP | 6273937 B2 | 2/2018 | |
| JP | 2019081531 A | 5/2019 | |

* cited by examiner

ROAD SURFACE CONDITION ESTIMATION APPARATUS AND ROAD SURFACE CONDITION ESTIMATION METHOD USING THE SAME

BACKGROUND

Field

The present disclosure relates to a road surface condition estimation apparatus and a road surface condition estimation method using the same, and more particularly to a road surface condition estimation apparatus which accurately estimates a road surface condition even under changes of external environment such as weather, etc., and a road surface condition estimation method using the same.

Description of the Related Art

A tire among parts of a vehicle is a unique component that contacts a road surface. Also, the tire generates a cornering force, a driving force, and a braking force of the vehicle, thereby enabling the vehicle to run. Therefore, the tire plays a very important role in the driving performance and safety of the vehicle.

The driving force, braking force, and cornering force generated between the tire and the road surface is significantly affected by the characteristics of the tire, the type and condition of the road surface.

Therefore, when the vehicle is able to estimate the road surface condition in real time and to provide information thereon to the ECU of the vehicle, it is possible to expect the performance improvement of the vehicle control such as ABS, ADAS, etc.

Also, such information can give attention to a driver of the vehicle through a vehicle dashboard or the like and induce driving appropriate for each road surface. For example, when a wet road surface is detected, the driver will slow down the vehicle in order to avoid hydroplaning, etc.

As this road surface estimation method, there is a method of photographing a road surface by using a camera mounted on the vehicle, and the like and estimating the road surface by using image processing. However, a lens of the camera may be contaminated on wet roads or snowy roads, resulting in poor image resolution. Further, optical road surface recognition may be difficult in dark nights.

Also, the installation of additional cameras may increase vehicle cost and cause the complexity of an on-board sensor network of the vehicle.

The road surface condition may be indirectly estimated on the basis of a vehicle dynamic model and vehicle driving condition information measured by the on-board sensor. This estimation method is being widely used for vehicle control. However, this method has a disadvantage that errors may be accumulated in the indirect estimation process and the estimation can be made only when a certain amount or more of slip occurs between the road surface and the tire.

U.S. Pat. No. 9,170,102 classifies various road surface conditions by using the characteristics of an acceleration waveform measured by an acceleration sensor attached inside the tire. This invention proposes a method for distinguishing between snowy roads, rainy roads, dry roads, icy roads, etc., and an apparatus of the same. The conditions of snowy road can be analyzed in detail such as compacted snow, deeply sherbet like snow, shallowly sherbet like snow or the like.

However, in order to determine whether or not a material is covered on the road surface, for example, in order to distinguish between a wet road surface and a dry road surface, the U.S. Pat. No. 9,170,102 requires additionally measuring the temperature of the road surface and noise generated from tires.

These road surface temperature sensors and sound recording sensors are additionally installed in the vehicle, which causes the complexity of the sensor network and increases the cost of sensors. Also, the accuracy of the estimation result presented as an embodiment in the patent is 57% to 86% and not high under road surface conditions such as wet, icy, sherbet, etc. In order for the road surface estimation result to be effectively used for vehicle control and the like, the accuracy is required to be 90% or more.

U.S. Patent Publication No. 2018-0222458 proposes a method for extracting a contact area of an acceleration sensor of a tire at various travel speeds. Since the acceleration sensor measuring inside the tire is affected by the travel speed, it is difficult for an algorithm for separating the contact area at a particular speed to extract effectively the contact area at different travel speeds. Therefore, a contact area separation algorithm including the speed effect was proposed, and a road surface with a high coefficient of friction and a road surface with a low coefficient of friction are separated by using vibration energy of the acceleration signal of the separated contact area.

However, this method cannot accurately estimate because a road surface estimation algorithm does not include not only the tire contact area but also the vibration characteristics before and after contacting. Also, it is impossible to provide detailed road surface information to the ECU simply by separating an asphalt road surface from the road surface having a low coefficient of friction.

Therefore, there is a need for a technology capable of more accurately estimating the road surface condition.

PRIOR ART DOCUMENT

U.S. Pat. No. 9,170,102

SUMMARY

Technical Problem

The object of the present disclosure for solving the above-mentioned problems is to provide a road surface condition estimation apparatus which accurately estimates a road surface condition even under changes of external environment such as weather, etc., and a road surface condition estimation method using the same.

The technical problem to be overcome in this document is not limited to the above-mentioned technical problems. Other technical problems not mentioned can be clearly understood from those described below by a person having ordinary skill in the art.

Technical Solution

One embodiment is a road surface condition estimation apparatus of a tire. The road surface condition estimation apparatus includes: a sensor module which is mounted on a tire; a receiver module which receives sensing information measured by the sensor module; a processing module which extracts a parameter for estimating a road surface condition by analyzing the sensing information received by the receiver module; and an estimation module which estimates the road surface condition by using the parameter extracted by the processing module. The sensing information includes an acceleration of the tire.

The sensor module is formed in a center of a tread of an inner surface of the tire.

The sensor module includes: an acceleration sensor provided to measure circumferential and radial accelerations of the tire; and a pressure sensor provided to measure an internal pressure of the tire.

The processing module extracts the parameter by analyzing acceleration vibration characteristics through an acceleration waveform graph.

The processing module is provided to extract a contact area of the tire from the acceleration waveform graph and to extract the parameter through frequency analysis of the contact area.

The processing module extracts, from the acceleration waveform graph, between a minimum value and a maximum value of a differential value of a radial acceleration graph as the contact area.

The processing module extracts, from the acceleration waveform graph, between a minimum value and a maximum value of a circumferential acceleration graph as the contact area.

The processing module analyzes a power spectrum density in a high frequency range in accordance with road surfaces to select a frequency range of interest, and determines signal energy calculated within the frequency range of interest as the parameter input to machine learning.

The signal energy is calculated by the following equation.

$$y = \int_{f_1}^{f_2} |X(f)|^2 df$$

(y: signal energy, f1: a start point of the frequency range of interest, f2: an end point of the frequency range of interest, X(f): power spectrum density within the frequency range of interest)

The signal energy is calculated for within the contact area, an area before contacting, an area after contacting, and an entire area which have been extracted respectively from the circumferential acceleration graph and the radial acceleration graph of the tire. The calculated value is included in the parameter which is input to the machine learning.

A frequency band of the high frequency range is 1.5 kHz to 4.5 kHz.

The frequency range of interest is a range determined to be capable of analyzing the power spectrum density in the high frequency range in accordance with road surfaces and of distinguishing differences between the road surfaces.

The estimation module is provided to estimate the road surface condition by further including a tire pressure, a tire bearing load, and a travel speed in addition to a plurality of the parameters extracted by the processing module.

The road surface condition estimation apparatus further includes a display module provided to show the road surface condition estimated from the estimation module to a user.

The road surface condition estimation apparatus further includes an ECU module provided to receive the estimated road surface condition from the estimation module. The ECU module is provided to control a vehicle in accordance with the road surface condition.

Another embodiment is a road surface condition estimation method using the road surface condition estimation apparatus of a tire. The road surface condition estimation method includes: a) measuring an acceleration of a tire; b) providing the measured acceleration to the processing module; c) analyzing the provided acceleration and extracting a parameter for estimating a road surface condition; and d) estimating the road surface condition by using the extracted parameter.

The step c) includes: c1) obtaining an acceleration waveform graph during one rotation of the tire; c2) extracting a contact area of the tire from the acceleration waveform graph; c3) selecting a frequency range of interest by analyzing, in accordance with road surfaces, a power spectrum density in a high frequency range for within the contact area, an area before contacting, an area after contacting, and an entire area; c4) calculating signal energy within the selected frequency range of interest; and c5) extracting the calculated signal energy as a parameter.

The road surface condition estimation method further includes, after the step d), displaying the estimated road surface condition to a user and controlling a vehicle in response to the road surface condition.

Advantageous Effects

The embodiment of the present disclosure warns a driver of rainy roads, snowy roads, etc., thereby enabling the driver to drive in preparation for this.

A current method related to ABS braking determines, during initial braking, an appropriate slip ratio by estimating the friction coefficient of a road surface on the basis of the speed and degree of occurrence of wheel slip. However, a slight delay occurs in estimating the appropriate slip ratio through this process, which leads to an increase in the braking distance. However, according to the present disclosure, if road surface types are provided to the ECU, the initial estimation of ABS algorithm can be reduced and the braking distance can be reduced by about 5%.

Also, if vehicles are connected by telematics, information on the preceding vehicle can be shared to recognize the road surface condition in advance and defensive driving is possible. Also, if vehicles are connected with related organizations such as road traffic authority, etc., the organizations can provide a road condition map and the like in real time.

Also, regarding autonomous vehicles, if the road surface condition is known in advance, the feedback process of the feedback control minimized by determining an input appropriate for steering and braking inputs, so that it is possible to increase stability.

Also, according to the present disclosure, the dynamic characteristics of a running tire is measured by a sensor attached inside the tire, and then the road surface condition is estimated through characteristic analysis of the measured waveform. Accordingly, according to the present disclosure, the road surface condition can be estimated even in a normal driving condition where no slip occurs between the tire and the road surface, and since the sensing value inside the tire is directly used, the accumulation of errors in an existing indirect estimation method can be minimized and the estimation accuracy can be improved.

By separating signals into different contact regions and by extracting characteristics from each region respectively, the resolution of the classifier can be improved compared when the signal is dealt with as a whole.

Also, according to the present disclosure, the characteristics of the measured acceleration signal are extracted when the tire contacts and before and after the tire contacts, and the characteristics are used as an input parameter of the machine learning technique. Also, various road surface types can be accurately estimated by using only the measured values of the acceleration sensor attached inside tire.

The effect of the present disclosure is not limited to the above effects and should be construed as including all the effects that can be inferred from the configuration of the present disclosure disclosed in the detailed description or claims of the present disclosure.

DETAILED DESCRIPTION

Figure 1:
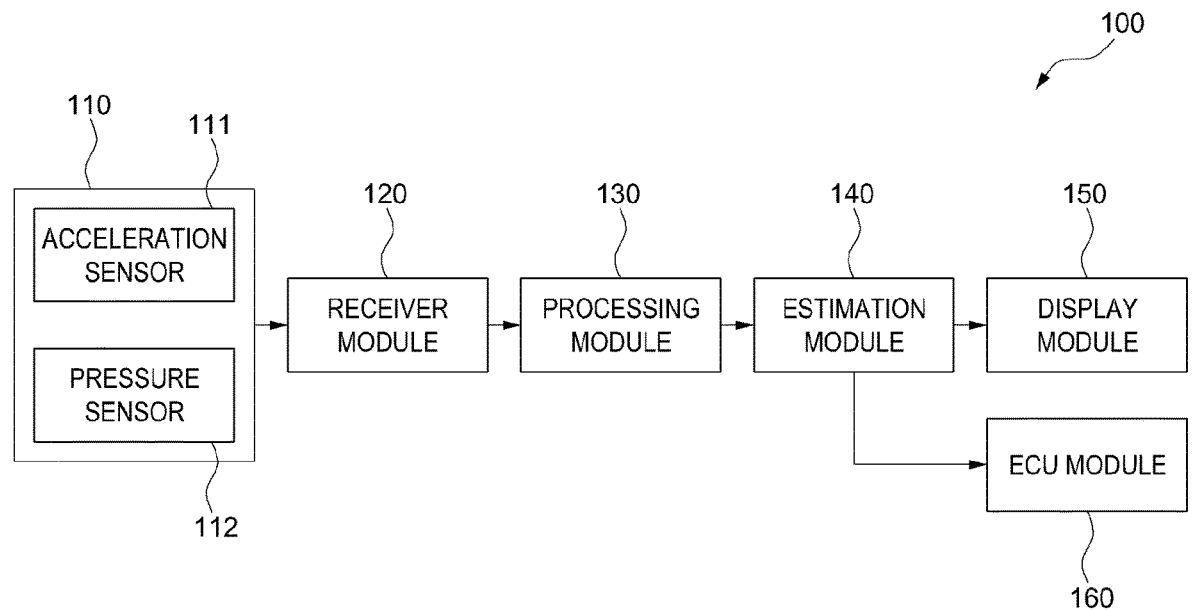
FIG. 1 is a view showing an example of a configuration of a road surface condition estimation apparatus according to an embodiment of the present disclosure.

Hereinafter, the present disclosure will be described with reference to the accompanying drawings. However, the present disclosure may be embodied in various forms and is not limited to the embodiment described in the present specification. In the drawings, parts irrelevant to the description will be omitted for a clear description of the present disclosure. Similar reference numerals will be assigned to similar parts throughout this patent document.

Throughout the specification, when it is mentioned that a portion is "connected (accessed, contacted, combined)" to another portion, it includes not only "is directly connected" but also "indirectly connected" with another member placed therebetween. Additionally, when it is mentioned that a portion "includes" a component, it means that the portion does not exclude but further includes other components unless there is a special opposite mention.

Terms used in the present specification are provided for description of only specific embodiments of the present invention, and not intended to be limiting. An expression of a singular form includes the expression of plural form thereof unless otherwise explicitly mentioned in the context. In the present specification, it should be understood that the term "include" or "comprise" and the like is intended to specify characteristics, numbers, steps, operations, components, parts or any combination thereof which are mentioned in the specification, and intended not to previously exclude the possibility of existence or addition of at least one another characteristics, numbers, steps, operations, components, parts or any combination thereof.

Embodiments of the present disclosure will be described in detail with reference to the accompanying drawings.

FIG. 1 is a view showing an example of a configuration of a road surface condition estimation apparatus according to an embodiment of the present disclosure.

As shown in FIG. 1, the road surface condition estimation apparatus 100 of a tire includes a sensor module 110, a receiver module 120, a processing module 130, an estimation module 140, a display module 150, and an ECU module 160.

Figure 2:
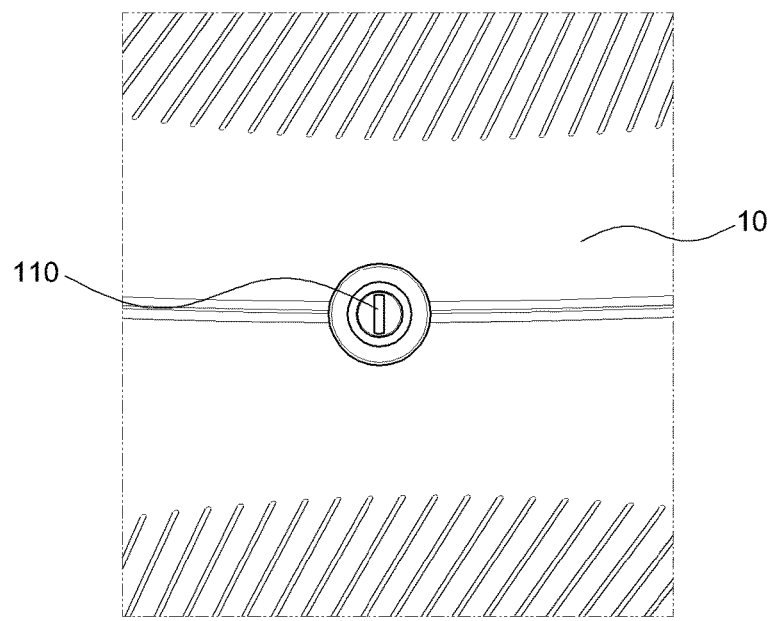
FIG. 2 is a view showing an example of a mounting position of a sensor module according to the embodiment of the present disclosure.

FIG. 2 is a view showing an example of a mounting position of the sensor module according to the embodiment of the present disclosure.

Referring further to FIG. 2, the sensor module 110 may be a tire mounted sensor (TMS) mounted within the tire. Since the sensor module 110 is mounted directly on the inner surface of the tire, the sensor module can obtain information on the deformation and vibration of a running tire by measuring acceleration.

Particularly, the sensor module 110 may be formed in the center of a tread 10 on the inner surface and may include an acceleration sensor 111 and a pressure sensor 112.

The acceleration sensor 111 may be provided to measure circumferential and radial accelerations of the tire, that is, an acceleration about a total of two axes.

Also, the pressure sensor 112 may be provided to measure an internal pressure of the tire.

The sensor module 110 provided as described above may measure sensing information on deformation and vibration of the tire.

Also, the sensor module 110 may be formed in the center of the tread 10 to minimize the influence of a wheel slip angle or a camber angle on the acceleration measurement.

The receiver module 120 may be provided to receive the sensing information measured by the sensor module 110.

Specifically, the sensor module 110 wirelessly transmits the measured acceleration and the internal pressure of the tire through a transmitter. Then, they are received by the receiver module 120 located within a vehicle system.

Here, a method for the above wireless transmission above may employ a method such as RF, BLE or the like.

An acceleration signal received by the receiver module 120 has information related to the vibration and deformation of the tire. Based on the information, tire characteristics vary according to the type of a road surface.

The processing module 130 may be provided to analyze the sensing information received by the receiver module 120 and to extract a parameter for estimating a road surface condition.

Here, the parameter may be referred to as a variable which is used in a road surface estimation model on the basis of an analysis of acceleration vibration characteristics measured on a dry road surface, a wet road surface, an icy road, a snowy road, etc.

The processing module 130 may be provided to extract the parameter by analyzing the acceleration vibration characteristics through an acceleration waveform graph for the two-axis acceleration measured by the sensor module 110. Here, the acceleration waveform graph shows changes in the acceleration depending on time for each of the two axes.

Figure 3A:
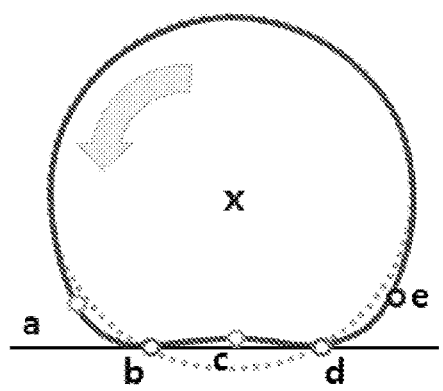
FIGS. 3A and 3B are views showing an example of a contact position according to one rotation of a tire in accordance with the embodiment of the present disclosure and an acceleration waveform graph thereof.
Figure 3B:
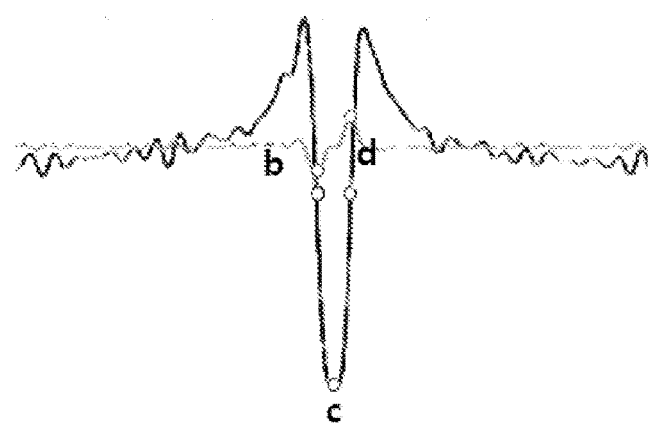

FIGS. 3A and 3B are view showing an example of a contact position according to one rotation of the tire in accordance with the embodiment of the present disclosure and the acceleration waveform graph thereof.

Referring to FIGS. 3A and 3B, the processing module 130 may extract a contact area of the tire from the acceleration waveform graph and extract the parameter through frequency analysis of the contact area.

As shown in FIGS. 3A and 3B, it can be seen that a sudden change in the acceleration occurs at a point b at which the tire starts to contact, at a point c during contacting, and at a point d at which the contact ends.

Specifically, the acceleration waveform has a maximum value or a minimum value due to the discontinuity of the tire shape in the contact arrears b to d. In the case of the acceleration in the z direction (radial direction), the acceleration converges to almost zero within the contact, and, outside the contact, has a value corresponding to the centrifugal force acceleration of the tire.

Accordingly, the processing module 130 may extract, from the acceleration waveform graph, between a minimum value and a maximum value of a differential value of a radial acceleration graph as the contact area.

Also, the processing module 130 may extract, from the acceleration waveform graph, between a minimum value and a maximum value of a circumferential acceleration graph as the contact area.

As such, the processing module 130 may be provided to derive the contact area of the tire from the acceleration waveform graph.

FIGS. 4A-4D are the circumferential acceleration graphs according to the road surface condition according to the embodiment of the present disclosure.

Figure 4A:
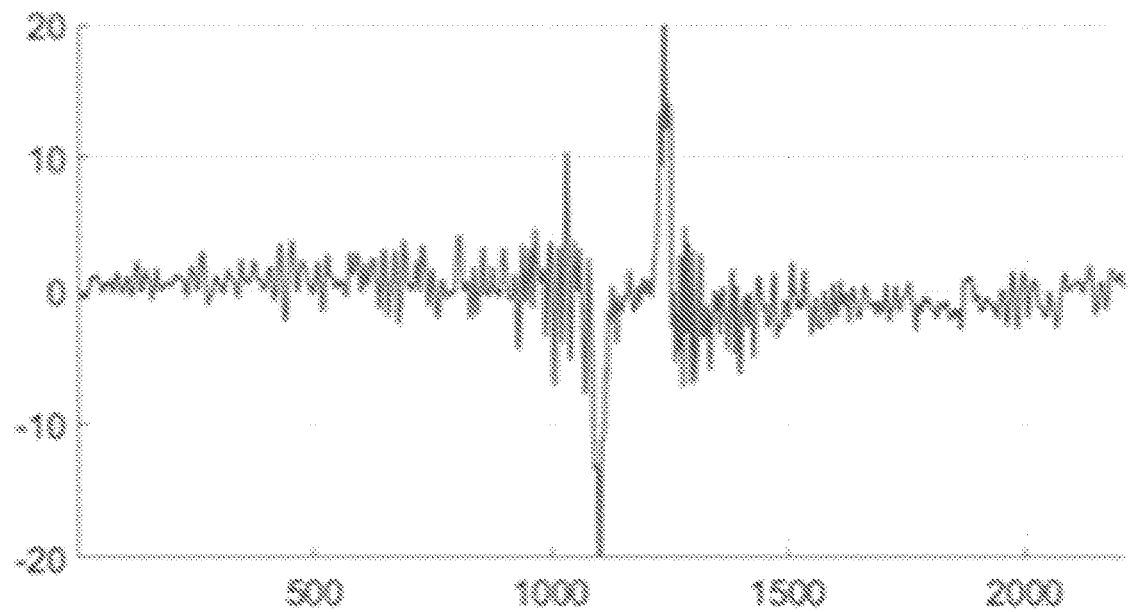
FIGS. 4A-4D are circumferential acceleration graphs according to the road surface condition according to the embodiment of the present disclosure.
Figure 4B:
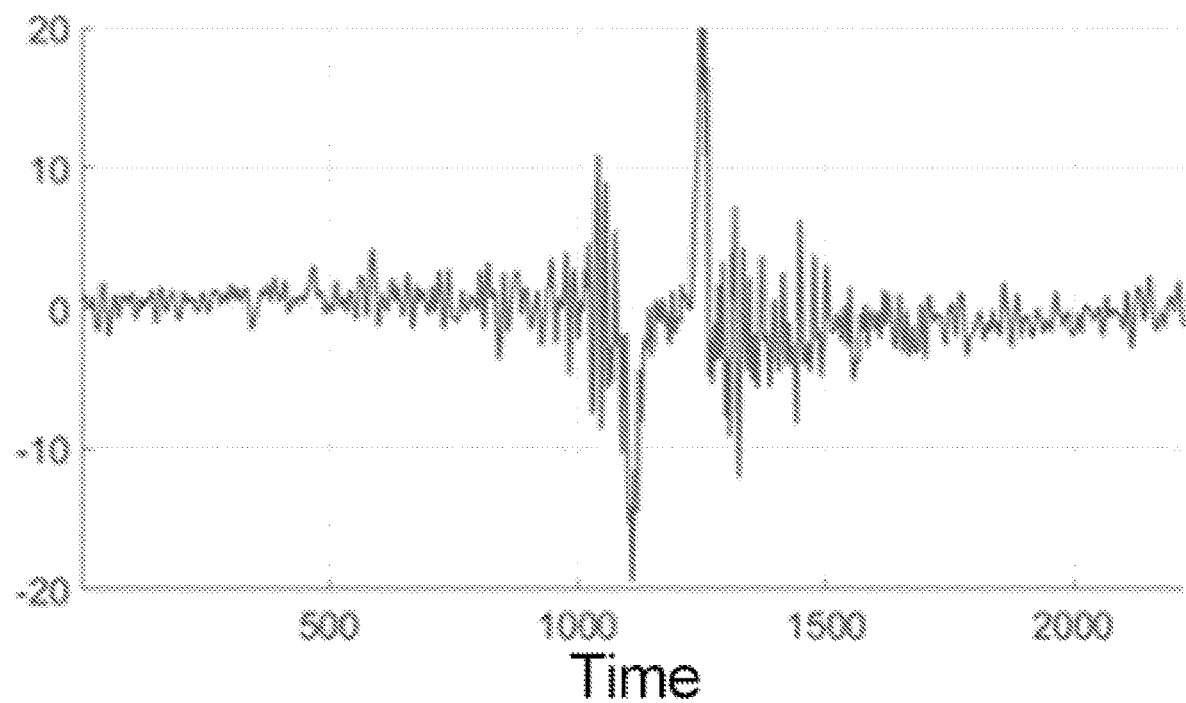

Referring further to FIGS. 4A-4D, the acceleration waveforms in the circumferential direction of the tire measured on various road surfaces can be seen, and vibration characteristics vary according to the type of the road surface. As shown in FIG. 4A, it can be found that the vibration energy of a dry road surface is overall lower than that of a wet road surface shown in FIG. 4B. In particular, high energy is observed in front of and behind the contact area.

Figure 4C:
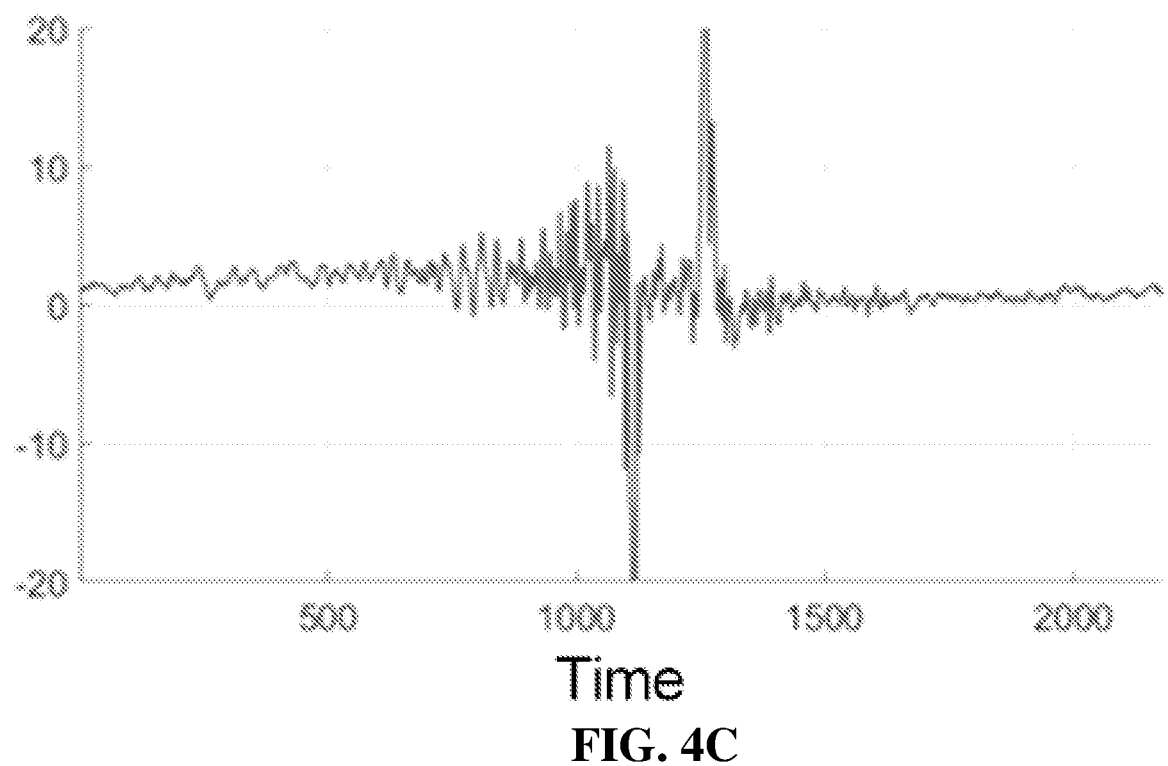
Figure 4D:
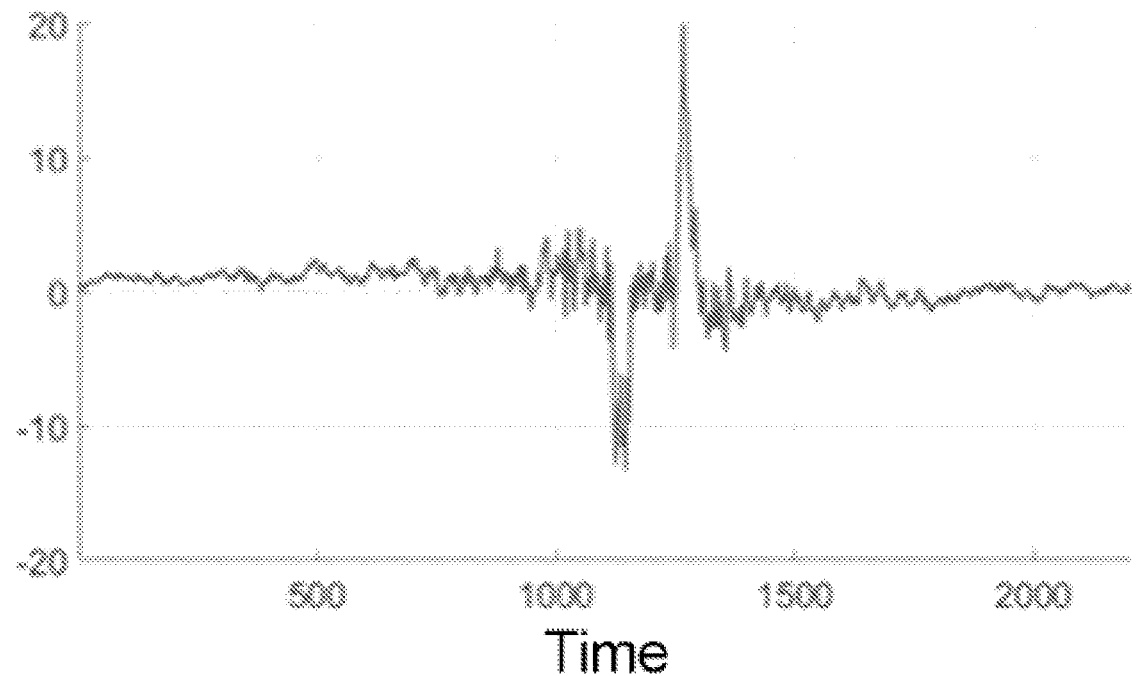

Also, as shown FIG. 4C, the vibration energy is higher in the front portion of the contact area than in the rear portion of the contact area on the icy road. Also, as shown in FIG. 4D, the vibration energy is higher in the rear portion of the contact area than in the front portion of the contact area on the snowy road.

As described above, since the acceleration vibration characteristics vary according to each road surface, it can be seen that an appropriate characteristic parameter for road surface estimation can be extracted from the acceleration waveform.

These parameters are used to develop data models by using machine learning. Further, when the characteristic parameter is extracted by dividing the acceleration signal on the basis of each section, that is, signal before contacting, signal during the contacting, and after contacting, a higher degree of estimation is possible.

Figure 5A:
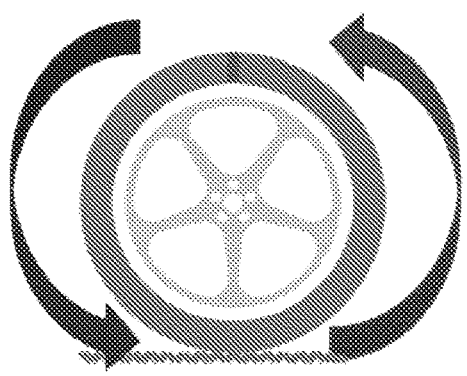
FIGS. 5A and 5B are views showing an example of a contact area of a radial acceleration and its time derivative graph according to the embodiment of the present disclosure.
Figure 5B:
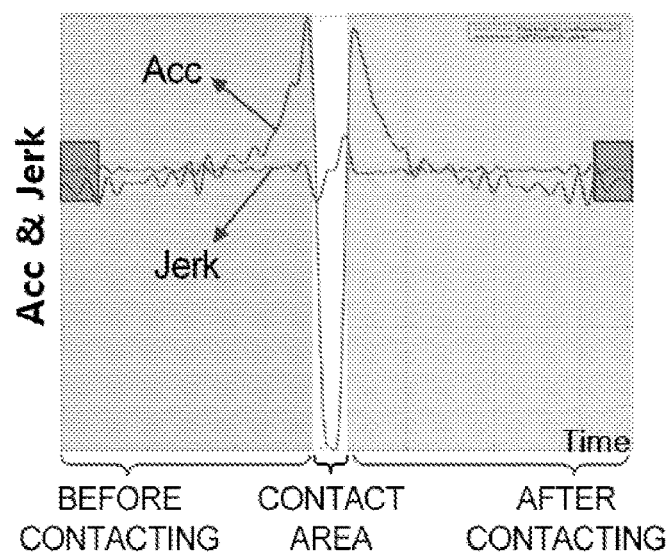

FIGS. 5A and 5B are views showing an example of the contact area of the radial acceleration graph according to the embodiment of the present disclosure.

Referring further to FIGS. 5A and 5B, it can be seen that the contact area is extracted by using a differential value of the radial acceleration. Since the differential value of the acceleration signal has minimum and maximum values at a contact start point and a contact end point, the contact area can be distinguished by extracting these points.

Also, although not shown, the present disclosure includes the use of the circumferential acceleration of the tire in order to distinguish the contact area.

Also, it is preferable that the processing module 130 uses a signal from which a high frequency noise has been removed by using a low-pass filter for the purpose of distinguishing the acceleration contact area.

Figure 6A:
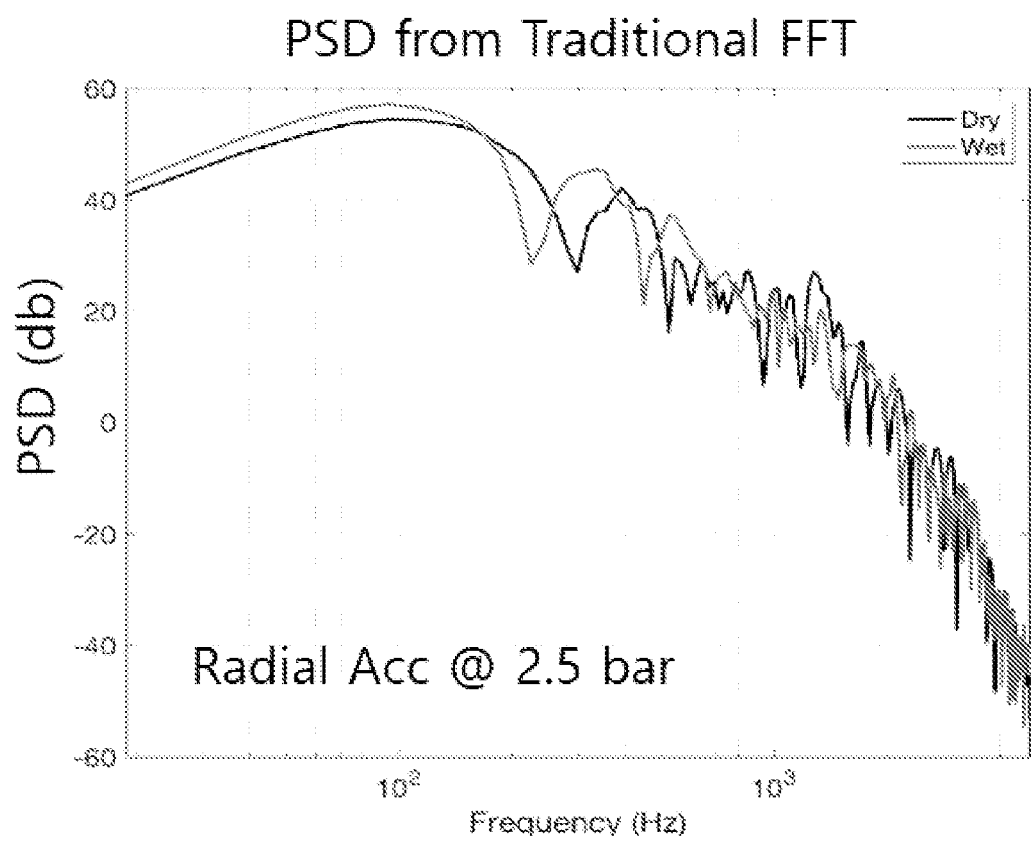
FIGS. 6A and 6B are graphs showing a frequency analysis method according to the embodiment of the present disclosure.
Figure 6B:
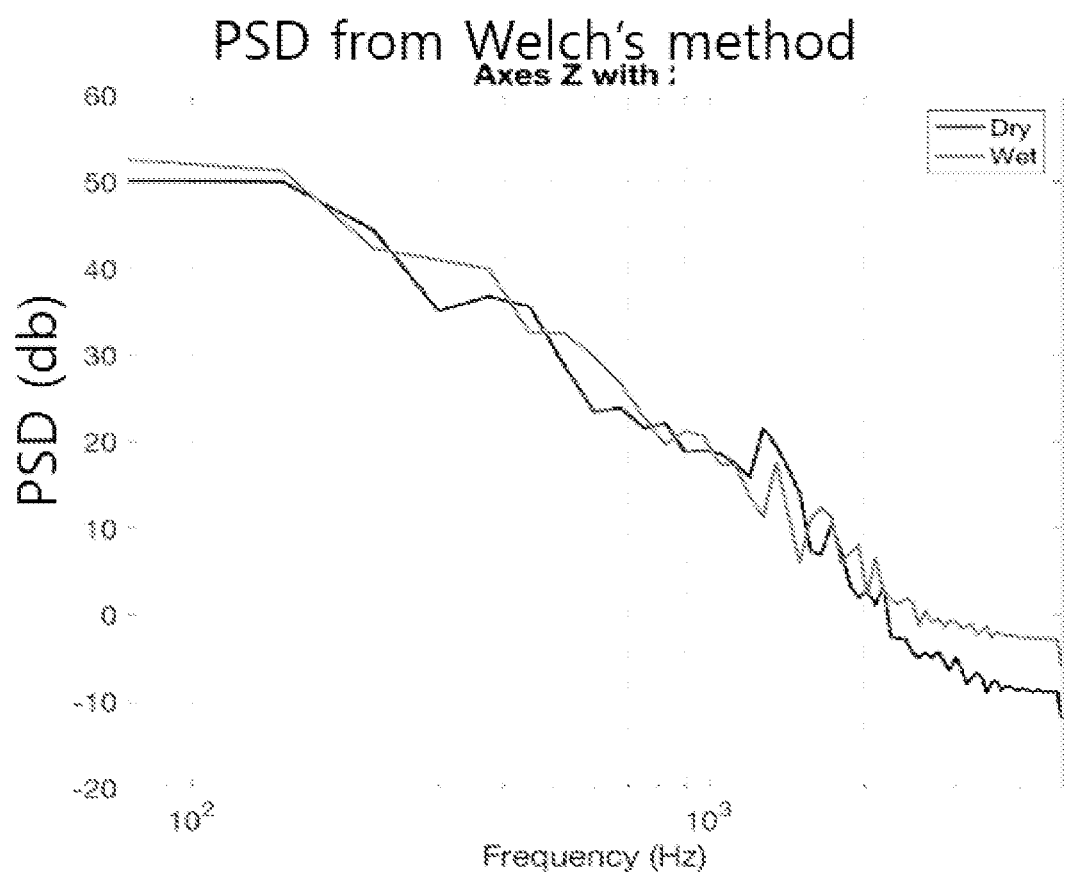

FIGS. 6A and 6B are graph showing a frequency analysis method according to the embodiment of the present disclosure.

Referring to FIGS. 6A and 6B, the processing module 130 is provided to extract a specific parameter which represents a difference according to the road surface by using a frequency analysis after distinguishing the contact area by using the acceleration waveform graph showing accelerations depending on time.

Specifically, a method which is mainly used for the frequency analysis of the signal is to use FFT analysis. However, the acceleration measured inside the tire includes various noises as shown in FIG. 6A. Accordingly, the processing module 130 may be provided to perform frequency analysis by using Welchi's method which is shown in FIG. 6B and has relatively low noise.

The graphs of FIGS. 6A and 6B show a change in power spectrum density according to frequency and compares a dry road surface with a wet road surface.

As described above, the processing module 130 analyzes the power spectrum density in a high frequency range in accordance with road surfaces to select a frequency range of interest, and determines signal energy calculated within the frequency range of interest as the parameter input to machine learning.

Here, the high frequency range may have a frequency band of 1.5 kHz to 4.5 kHz.

Also, the frequency range of interest may be referred to as a range determined to be capable of analyzing the power spectrum density in the high frequency range in accordance with road surfaces and of distinguishing differences between the road surfaces.

Figure 7A:
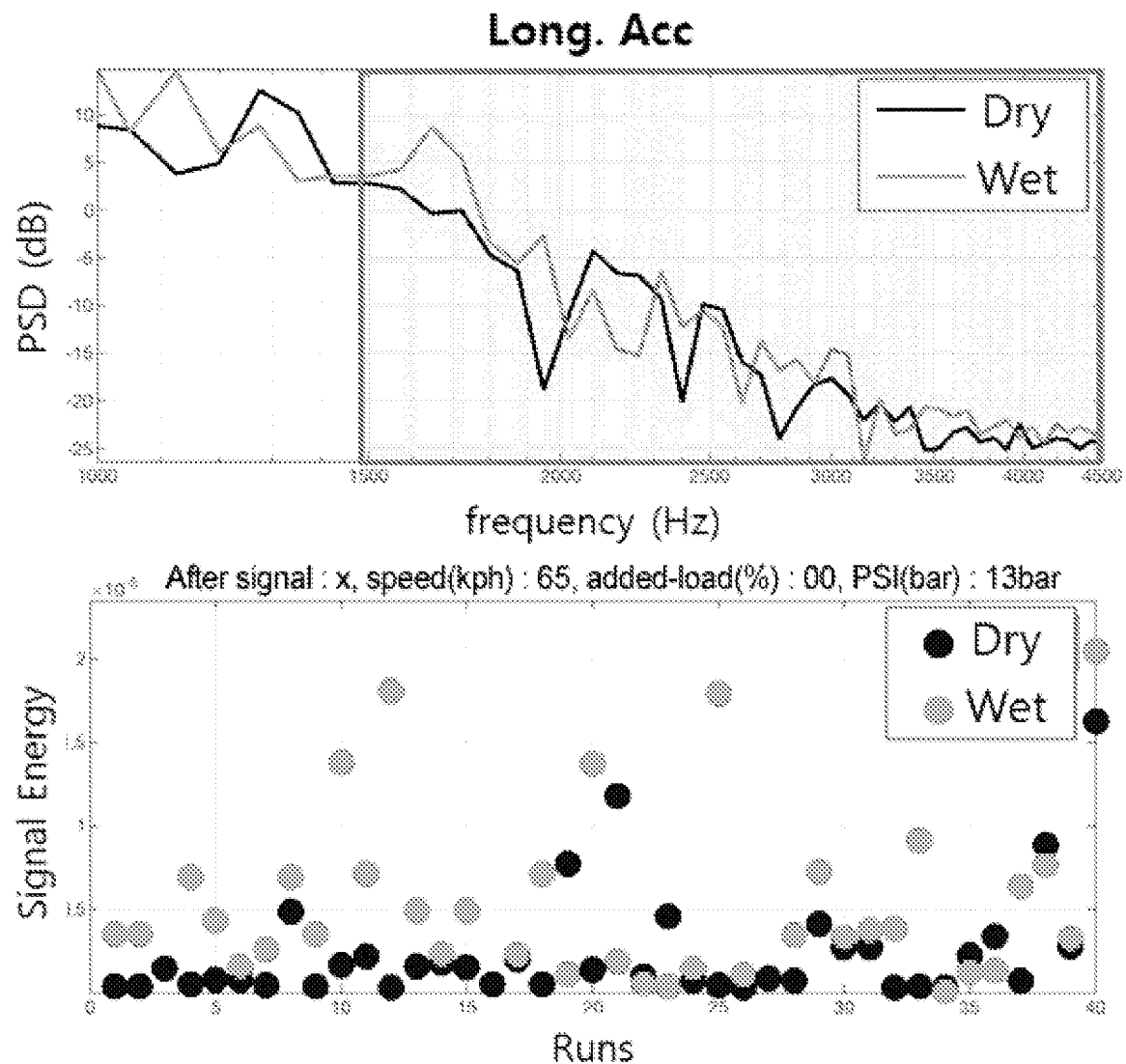
FIGS. 7A and 7B graphs showing a frequency range of interest and signal energy according to the embodiment of the present disclosure.
Figure 7B:
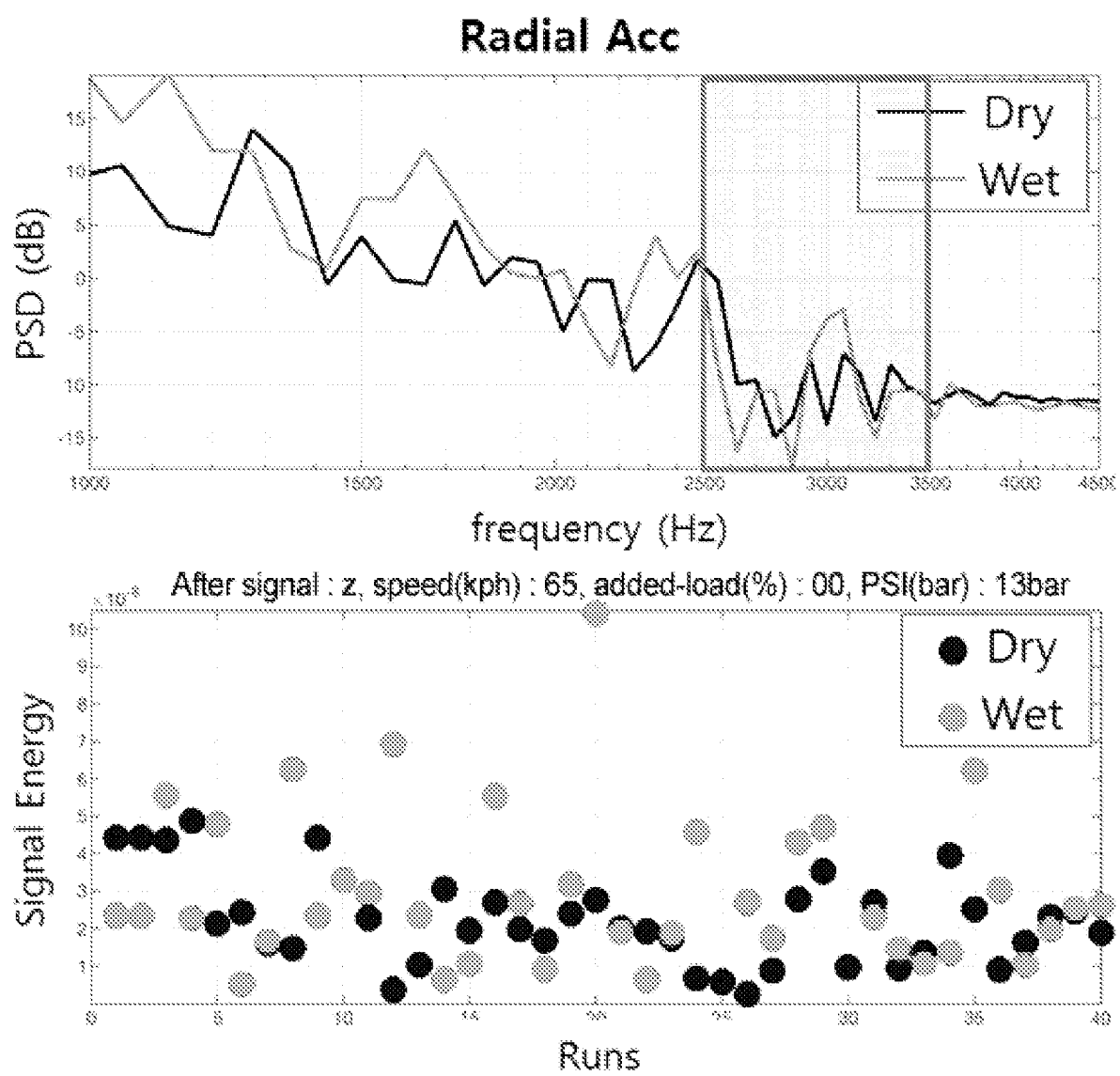

FIGS. 7A and 7B are graphs showing the frequency range of interest and the signal energy according to the embodiment of the present disclosure.

Describing with reference to FIGS. 7A and 7B, the processing module 130 analyzes the power spectrum density in the high frequency range in accordance with the road surfaces, and selects the frequency range of interest that clearly shows the difference between the road surfaces. This is represented as a highlighted region in FIGS. 7A and 7B.

The signal energy is calculated in the frequency range of interest and is defined as an input parameter of machine learning. The signal energy is calculated by the following equation.

$$y = \int_{f_1}^{f_2} |X(f)|^2 df$$

Here, y is the signal energy, f1 is a start point of the frequency range of interest, f2 is an end point of the frequency range of interest, and X(f) is the power spectrum density within the frequency range of interest.

The signal energy is calculated for within the contact area, an area before contacting, an area after contacting, and an entire area which have been extracted respectively from the circumferential acceleration graph and the radial acceleration graph of the tire. The calculated value may be a parameter which is input to the machine learning.

That is, the parameter may include eight or more values including the signal energy calculated for within the contact area, the area before contacting, the area after contacting, and the entire area which are extracted from the radial acceleration graph of the tire and the signal energy calculated for within the contact area, the area before contacting, the area after contacting, and the entire area which are extracted from the circumferential acceleration graph of the tire.

Since these extracted parameters maximize and show the characteristic difference that distinguishes according to the road surface condition, it is possible to more accurately measure the road surface condition.

The estimation module 140 may be provided to estimate the road surface condition by using the parameter extracted by the processing module 130.

Here, the estimation module 140 may be provided to estimate the road surface condition by further including a tire pressure, a tire bearing load, and a travel speed in addition to a plurality of the parameters extracted by the processing module.

Figure 8:
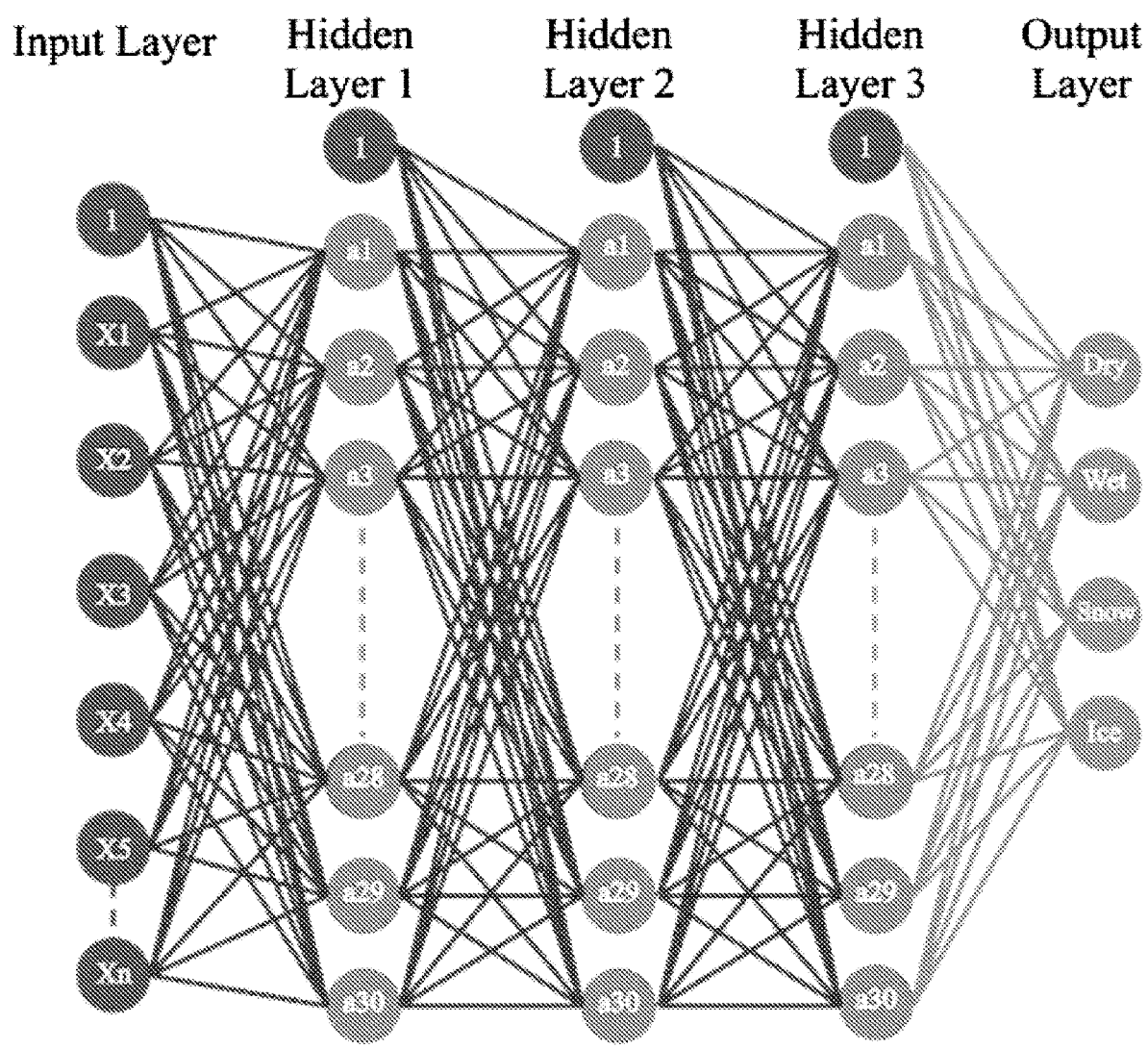
FIG. 8 is a view showing an example of a neural network model structure of an estimation module according to the embodiment of the present disclosure.

FIG. 8 is a view showing an example of a neural network model structure of the estimation module according to the embodiment of the present disclosure.

Referring further to FIG. 8, the estimation module 140 may be provided to estimate the road surface condition by using machine learning which has the extracted eight parameters and three test conditions as parameters.

As one embodiment, the estimation module 140 may be formed to have a model structure using the neural network shown in FIG. 8.

Specifically, there are a total of 11 input parameters consisting of test such as a tire pressure, a tire bearing load, and a travel speed and eight acceleration specific parameters. There are outputs of four estimated road conditions.

The neural network may be composed of three hidden layers, and each hidden layer may be composed of 30 neurons. The load applied to the tire can be estimated from the load and contact length estimated from the acceleration signal, and the value measured by the pressure sensor 112 is used as the pressure. The travel speed of the vehicle can be obtained through the CAN/Bus connection of the vehicle, and the speed may be collected by installing an additional GPS sensor.

The estimation module 140 which estimates the road surface condition by using such a neural network model has performed a test by using the number of about 5,000 data. In other words, during wheel rotations 5,000 times, 80% of the data was used for the machine learning and 20% of the data was used for the road surface condition estimation test.

The accuracy of the results estimated by this method has reached 92% in the current embodiment. Cross validation has been performed by using 10 folds in order to check for overfitting. For 10 cases, it was confirmed that there was no overfitting problem in the developed data model with similar level of accuracy.

Here, the method for estimating the road surface condition by the estimation module 140 is not limited to the model structure using the neural network. Various machine learning algorithms such as decision trees and random forests can be used.

That is, the estimation module 140 can include all the methods using a machine learning algorithm capable of estimating the road surface condition.

As such, the estimation module 140 may be provide to machine-learn the parameter change according to each road surface condition by using the parameters extracted by the processing module 130, and when a new parameter is input based on the data trained according to the machine learning, the estimation module 140 may be provided to estimate the road surface condition accordingly.

The display module 150 may be provided on a dashboard or the like of the vehicle, and may be provided to show the road surface condition estimated by the estimation module 140 to a user. The display module 150 provided as described above may warns a driver of rainy roads, snowy roads, etc., thereby enabling the driver to drive in preparation for this.

The ECU module 160 may be provided to receive the estimated road surface condition from the estimation module 140 and may be provided to control the vehicle according to the road surface condition.

A current method related to ABS braking determines, during initial braking, an appropriate slip ratio by estimating the friction coefficient of a road surface on the basis of the speed and degree of occurrence of wheel slip. However, a slight delay occurs in estimating the appropriate slip ratio through this process, which leads to an increase in the braking distance. However, according to the present disclosure, if road surface types are provided to the ECU module 160, the initial estimation of ABS algorithm can be reduced and the braking distance can be reduced by about 5%.

Also, if vehicles are connected by telematics, information on the preceding vehicle can be shared to recognize the road surface condition in advance and defensive driving is possible. Also, if vehicles are connected with related organizations such as road traffic authority, etc., the organizations can provide a road condition map and the like in real time.

Also, regarding autonomous vehicles, if the road surface condition is known in advance, the feedback process of the feedback control minimized by determining an input appropriate for steering and braking inputs, so that it is possible to increase stability.

Also, according to the present disclosure, the dynamic characteristics of a running tire is measured by the sensor module 110 attached inside the tire, and then the road surface condition is estimated through characteristic analysis of the measured waveform. Accordingly, according to the present disclosure, the road surface condition can be estimated even in a normal driving condition where no slip occurs between the tire and the road surface, and since the sensing value inside the tire is directly used, the accumulation of errors in an existing indirect estimation method can be minimized and the estimation accuracy can be improved.

Also, according to the present disclosure, the characteristics of the measured acceleration signal are extracted when the tire contacts and before and after the tire contacts, and the characteristics are used as an input parameter of the machine learning technique. Also, various road surface types can be accurately estimated by using only the measured values of the acceleration sensor 111 attached inside tire.

Figure 9:
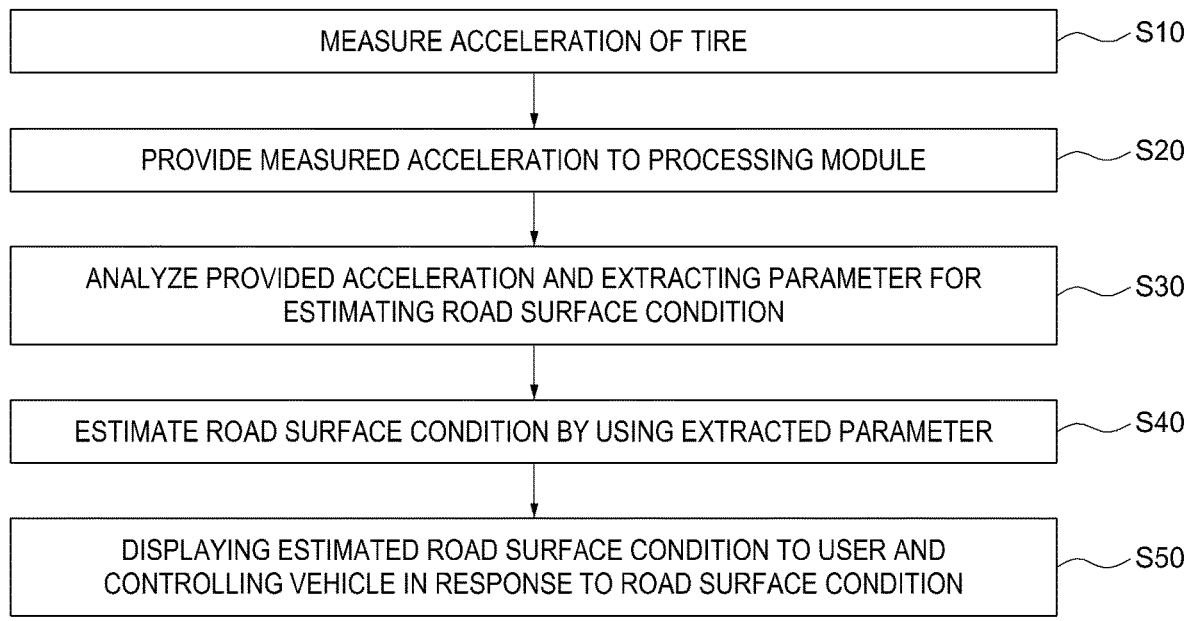
FIG. 9 is a flowchart of the road surface condition estimation apparatus according to the embodiment of the present disclosure and a road surface condition estimation method using the same.

FIG. 9 is a flowchart of the road surface condition estimation apparatus according to the embodiment of the present disclosure and a road surface condition estimation method using the same.

Referring to FIG. 9, in the road surface condition estimation method using the road surface condition estimation apparatus, first, a step S10 of measuring the acceleration of the tire may be performed.

In the step S10 of measuring the acceleration of the tire, the sensor module 110 may be provided to measure the acceleration of the tire.

In the step S10 of measuring the acceleration of the tire, the sensor module 110 may measure the circumferential and radial accelerations of the tire, that is, an acceleration about a total of two axes.

After the step S10 of measuring the acceleration of the tire, a step S20 of providing the measured acceleration to the processing module may be performed.

In the step S20 of providing the measured acceleration to the processing module, the receiver module 120 may be provided to provide the acceleration measured by the sensor module 110 to the processing module 130.

After the step S20 of providing the measured acceleration to the processing module, a step S30 of analyzing the provided acceleration and extracting the parameter for estimating the road surface condition may be performed.

Figure 10:
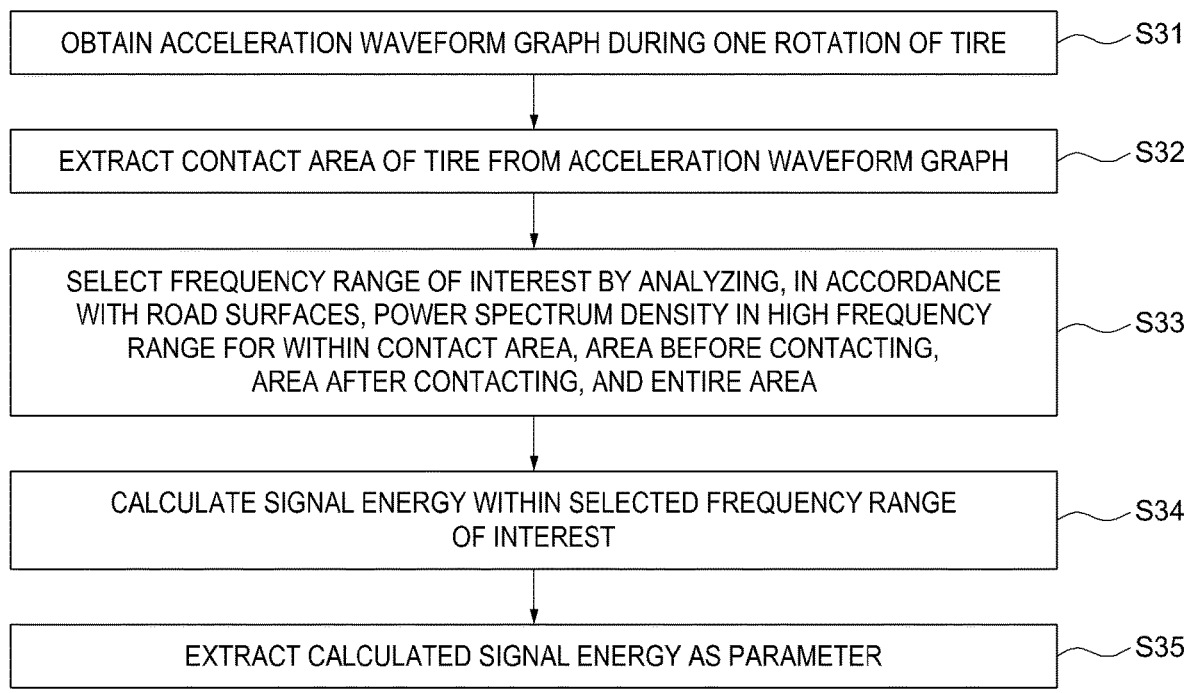
FIG. 10 is a flowchart of a step of extracting a parameter according to the embodiment of the present disclosure.

FIG. 10 is a flowchart of a step of extracting the parameter according to the embodiment of the present disclosure.

Referring to FIG. 10, in the step S30 of analyzing the provided acceleration and extracting the parameter for estimating the road surface condition, first, a step S31 of obtaining an acceleration waveform graph during one rotation of the tire may be performed.

After the step S31 of obtaining an acceleration waveform graph during one rotation of the tire, a step S32 of extracting a contact area of the tire from the acceleration waveform graph may be performed.

In the step S32 of extracting a contact area of the tire from the acceleration waveform graph, the processing module 130 may extract, from the acceleration waveform graph, between a minimum value and a maximum value of a differential value of a radial acceleration graph as the contact area. Also, the processing module 130 may extract, from the acceleration waveform graph, between a minimum value and a maximum value of a circumferential acceleration graph as the contact area.

After the step S32 of extracting a contact area of the tire from the acceleration waveform graph, a step S33 of selecting a frequency range of interest by analyzing, in accordance with road surfaces, a power spectrum density in a high frequency range for within the contact area, an area before contacting, an area after contacting, and an entire area may be performed.

In the step S33 of selecting a frequency range of interest by analyzing, in accordance with road surfaces, a power spectrum density in a high frequency range for within the contact area, an area before contacting, an area after contacting, and an entire area, the processing module 130 may analyze the power spectrum density in a high frequency range in accordance with road surfaces to select a frequency range of interest. Here, the high frequency range may have a frequency band of 1.5 kHz to 4.5 kHz. Also, the frequency range of interest may be referred to as a range determined to be capable of analyzing the power spectrum density in the high frequency range in accordance with road surfaces and of distinguishing differences between the road surfaces.

After the step S33 of selecting a frequency range of interest by analyzing, in accordance with road surfaces, a power spectrum density in a high frequency range for within the contact area, an area before contacting, an area after contacting, and an entire area, a step S34 of calculating signal energy within the selected frequency range of interest may be performed.

In the step S34 of calculating signal energy within the selected frequency range of interest, the signal energy is calculated for within the contact area, an area before contacting, an area after contacting, and an entire area which have been extracted respectively from the circumferential acceleration graph and the radial acceleration graph of the tire. The calculated value may be a parameter which is input to the machine learning.

After the step S34 of calculating signal energy within the selected frequency range of interest, a step S35 of extracting the calculated signal energy as a parameter may be performed.

In the step S35 of extracting the calculated signal energy as a parameter, the parameter may include eight or more values including the signal energy calculated for within the contact area, the area before contacting, the area after contacting, and the entire area which are extracted from the radial acceleration graph of the tire and the signal energy calculated for within the contact area, the area before contacting, the area after contacting, and the entire area which are extracted from the circumferential acceleration graph of the tire.

After the step S30 of analyzing the provided acceleration and extracting the parameter for estimating the road surface condition, a step S40 of estimating the road surface condition by using the extracted parameter may be performed.

In the step S40 of estimating the road surface condition by using the extracted parameter, the estimation module 140 may be provided to machine-learn the parameter change according to each road surface condition by using the parameters extracted by the processing module 130, and when a new parameter is input based on the data trained according to the machine learning, the estimation module 140 may be provided to estimate the road surface condition accordingly.

After the step S40 of estimating the road surface condition by using the extracted parameter, a step S50 of displaying the estimated road surface condition to a user and controlling a vehicle in response to the road surface condition may be performed.

In the step S50 of displaying the estimated road surface condition to a user and controlling a vehicle in response to the road surface condition, the display module 150 may be provided on a dashboard or the like of the vehicle, and may be provided to show the road surface condition estimated by the estimation module 140 to a user. The display module 150 provided as described above may warns a driver of rainy roads, snowy roads, etc., thereby enabling the driver to drive in preparation for this.

Also, in the step S50 of displaying the estimated road surface condition to a user and controlling a vehicle in response to the road surface condition, the ECU module 160 may be provided to receive the estimated road surface condition from the estimation module 140 and may be provided to control the vehicle according to the road surface condition.

The above-mentioned descriptions of the present disclosure are provided for illustration. It can be understood by those skilled in the art that the present invention can be embodied in other specific forms without departing from its spirit or essential characteristics. Therefore, the foregoing embodiments and advantages are merely exemplary and are not to be construed as limiting the present invention. For example, each component described as a single type may be implemented in a distributed manner, and similarly, components described as being distributed can also be implemented in a combined form.

The scopes of the embodiments are described by the scopes of the following claims. All modification, alternatives, and variations derived from the scope and the meaning of the scope of the claims and equivalents of the claims should be construed as being included in the scopes of the embodiments.

REFERENCE NUMERALS

| | |
|---|---|
| 100: road surface conditionestimation apparatus of tire | |
| 110: sensor module | 111: acceleration sensor |
| 112: pressure sensor | 120: receiver module |

| REFERENCE NUMERALS | |
| --- | --- |
| 130: processing module | 140: estimation module |
| 150: display module | 160: ECU module |

What is claimed is:

1. A road surface condition estimation apparatus for a tire, the apparatus comprising:
a sensor module mounted on the tire;
a receiver module configured to receive sensing information measured by the sensor module;
a processing module configured to extract a parameter for estimating a road surface condition by analyzing the sensing information received by the receiver module; and
an estimation module configured to estimate the road surface condition by using the parameter extracted by the processing module,
wherein the sensing information comprises an acceleration of the tire,
wherein the processing module is configured to extract the parameter by analyzing acceleration vibration characteristics through an acceleration waveform graph, wherein the processing module is configured to extract a contact area of the tire from the acceleration waveform graph and extract the parameter through frequency analysis of the contact area,
wherein the processing module is configured to analyze a power spectrum density in a high frequency range in accordance with road surfaces to select a frequency range of interest, and calculate signal energy within the selected frequency range of interest to determine the calculated signal energy as a parameter which is input to machine learning,
wherein the signal energy is calculated by a following equation:

$$y=\int_{f_1}^{f_2} |X(f)|^2 df$$

wherein, y is the signal energy, f1 is a start point of the frequency range of interest, f2 is an end point of the frequency range of interest, and X(f) is the power spectrum density within the frequency range of interest.

2. The road surface condition estimation apparatus of claim 1, wherein the sensor module is mounted in a center of a tread of an inner surface of the tire.

3. The road surface condition estimation apparatus of claim 2, wherein the sensor module comprises:
an acceleration sensor configured to measure circumferential and radial accelerations of the tire; and
a pressure sensor configured to measure an internal pressure of the tire.

4. The road surface condition estimation apparatus of claim 1, wherein the frequency range of interest is a range determined to be capable of analyzing the power spectrum density in the high frequency range in accordance with road surfaces and of distinguishing differences between the road surfaces.

5. The road surface condition estimation apparatus of claim 1, wherein the estimation module estimates the road surface condition by further using a tire pressure, a tire bearing load, and a travel speed in addition to a plurality of parameters extracted by the processing module.

6. The road surface condition estimation apparatus of claim 1, wherein the processing module is configured to extract, from the acceleration waveform graph, between a minimum value and a maximum value of a differential value of a radial acceleration graph as the contact area.

7. The road surface condition estimation apparatus of claim 1, wherein the processing module is configured to extract, from the acceleration waveform graph, between a minimum value and a maximum value of a circumferential acceleration graph as the contact area.

8. The road surface condition estimation apparatus of claim 1, further comprising a display module configured to show the estimated road surface condition to a user.

9. The road surface condition estimation apparatus of claim 1, further comprising an ECU module configured to receive the estimated road surface condition from the estimation module, wherein the ECU module is configured to control a vehicle in accordance with the road surface condition.

10. The road surface condition estimation apparatus of claim 1, wherein the signal energy is calculated for the contact area, an area before contacting, an area after contacting, and an entire area which have been extracted respectively from a circumferential acceleration graph and a radial acceleration graph of the tire, and wherein the calculated signal energy is comprised in the parameter which is input to the machine learning.

11. The road surface condition estimation apparatus of claim 1, wherein a frequency band of the high frequency range is 1.5 kHz to 4.5 kHz.

12. A road surface condition estimation method, the method comprising:
a) measuring an acceleration of a tire;
b) providing the measured acceleration to a processing module;
c) analyzing the provided acceleration and extracting a parameter for estimating a road surface condition; and
d) estimating the road surface condition by using the extracted parameter,
wherein the step c) comprises:
c1) obtaining an acceleration waveform graph during one rotation of the tire;
c2) extracting a contact area of the tire from the acceleration waveform graph;
c3) selecting a frequency range of interest by analyzing, in accordance with road surfaces, a power spectrum density in a high frequency range for the contact area, an area before contacting, an area after contacting, and an entire area;
c4) calculating signal energy within the selected frequency range of interest; and
c5) determining the calculated signal energy as a parameter.

13. The road surface condition estimation method of claim 12, further comprising, after the step d), displaying the estimated road surface condition to a user and controlling a vehicle in response to the road surface condition.

\* \* \* \* \*